April 14, 1942. H. BRANDENBURG ET AL 2,279,775
BRAKE FOR REVOLVING MACHINE PARTS
Filed June 27, 1940

Patented Apr. 14, 1942

2,279,775

UNITED STATES PATENT OFFICE 2,279,775

BRAKE FOR REVOLVING MACHINE PARTS

Hermann Brandenburg, Berlin-Tempelhof, and Karl Bienert, Berlin, Germany, assignors to Mergenthaler Linotype Company, Brooklyn, N. Y., a company of New York Application June 27, 1940, Serial No. 342,634 In Germany November 27, 1939

12 Claims. (Cl. 188—110)

This invention relates to an improved brake for revolving machine parts of the self-acting type and its object is to provide a brake which is of simple and compact construction and which also may be advantageously employed to dissipate energy for the purpose of eliminating play in mechanical driving connections in which the release of the brake upon a portion of the operative track is desirable for the purpose of effecting an economy in the energy expended.

With these and other ends in view the invention provides a self-acting brake for revolving machine parts wherein an expanding brake member engages the revolving part to apply the brake and the expansion of the said member is controlled in accordance with a predetermined cycle or characteristic. Such control may be brought about by means of one or more cam shaped recesses in one of the brake surfaces. The brake is thus a friction brake, the braking surfaces being the said expanding member and the revolving member, which may be a rotatable shaft, or a sleeve surrounding the same.

Preferably, the expanding brake member is in the form of a slotted brake ring or shoe encircling the part to be braked, which member is resiliently contracted and is expanded by means of a ball, roller or like spreader member. The said spreader member, in its inactive position, may be located in a recess or one of a plurality of recesses formed on the periphery of the shaft or other revolving part surrounded by the brake ring or shoe and when the shaft or other revolving part is rotated, the said spreader member is raised upon the periphery of the shaft or other part as aforesaid at certain parts thereof. In order that the brake may be completely released as desired the brake ring preferably rests against a stationary support on that side of the shaft which is opposite to the spreader member.

For a better understanding of the invention a preferred embodiment thereof will now be described with reference to the accompanying drawing in which—

Figure 1:
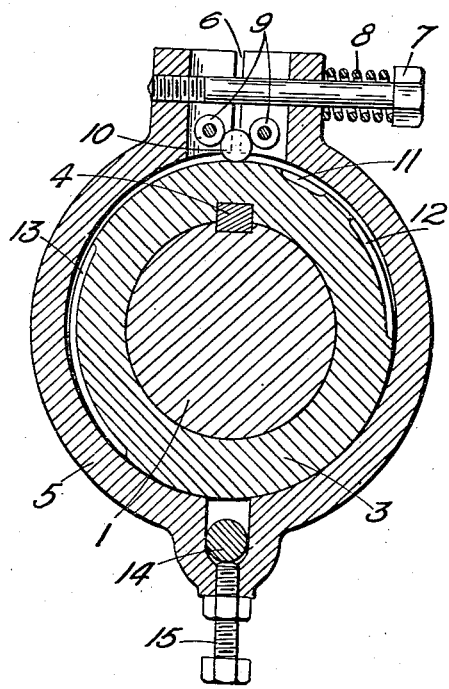
Figure 1 is a vertical cross section of a brake constructed according to the invention.
Figure 2:
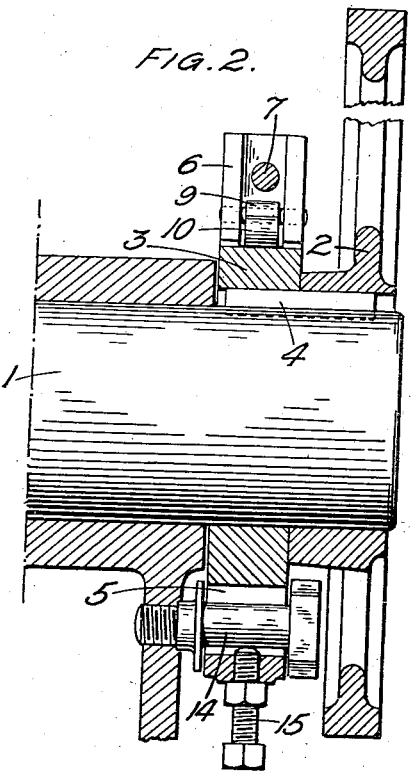
Figure 2 is a longitudinal section through Figure 1.
Figure 4:
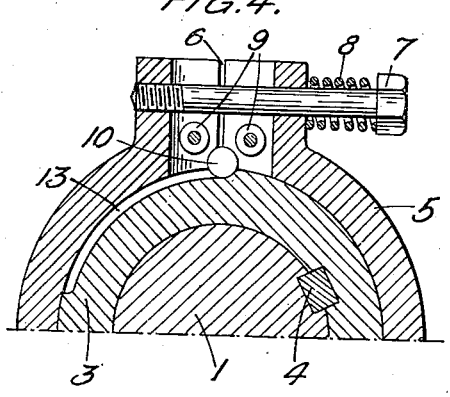
Figure 4 is a part cross section similar to Figure 1, but showing the brake member in a different position.
Figure 3:
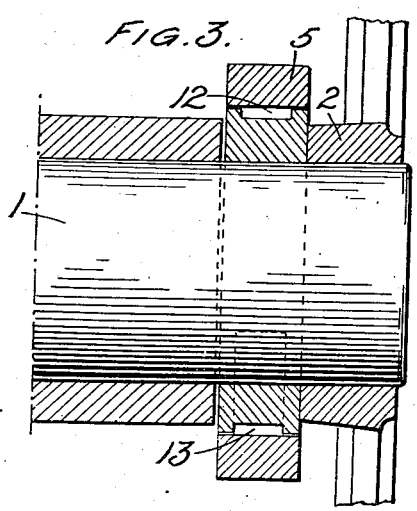
Figure 3 is a horizontal cross section of the brake shown in Figures 1 and 2.

The brake mechanism which is shown in the drawing is an example of one method of carrying the invention into effect and shows the use of the brake for the purpose of dissipating energy so as to eliminate play in the main cam shaft of a machine such as a typographical composing and slug casting machine of the kind known commercially under the registered trade-mark "Linotype" in which a number of cams are positioned on a main cam shaft. In this embodiment the object of the invention is to prevent over-running of the shaft in certain positions in which, owing to cam parts being resiliently positioned on inclined portions of the cams such over-running would be liable to take place in the absence of special provision being made to prevent it. It is, however, to be understood that the brake which is the subject of the present invention is also adapted to be used with arrangements on any type of machine where it is important to produce a brake action at given periods which is afterwards released, such as for the purpose of eliminating play in toothed gear driving connections for lathes, grinding machines or the like.

Referring now to the drawing, 1 is the main cam shaft of a typographical composing and slug casting machine to one end of which is fixed a ring or sleeve 3 by means of a key 4. The said sleeve 3 is located adjacent a control cam 2 which operates one part of the machine and the control cam is also positioned on the shaft 1. The outer peripheral surface of the said sleeve 3 is formed with a brake controlling surface. It will be apparent that the outer surface of the shaft 1 may also be used as a brake controlling surface. The said sleeve 3 is surrounded by a frictional brake ring or shoe 5 which is split or slotted at 6 and which is normally contracted by means of a bolt 7 and a compression spring 8 so as to ensure that the brake shoe or ring 5 tightly encircles the sleeve 3. On the said brake ring or shoe 5 and on either side of the slot 6 are mounted two rollers 9 which are in contact with a spreader roller 10. The spreader roller 10 is located between the rollers 9 and is supported upon the periphery of the ring 3. The dimensions of the parts are so selected that in this position the spreader roller 10 expands the brake ring or shoe 5 as shown in Figure 1 so that no braking action takes place. On the circumference of the ring 3 and connected to the shaft 1 recesses 11, 12 and 13 are provided which are designed to control an automatic tightening of the brake from time to time. When the shaft 1 and the sleeve 3 connected thereto are rotated, the recesses 11, 12, 13 which pass in turn under the roller 10 allow the latter to drop into them so that the rollers 9 come closer together due to the compression action of the spring 8 on the brake shoe, and a braking effect is produced. The location of the recesses 11, 12, 13 corresponds with the position of certain edge cams which are not illustrated and in reference to which an undesired over-run might occur.

In order to ensure that the brake ring 5 is completely released when expanded, the said ring is mounted by means of a slot-shaped recess on a support 14 rigidly secured to the machine frame on the side of the shaft which it surrounds opposite to that on which the spreader member 10 is disposed. The result of this is that the vertical component of the forces acting upon the rollers 9 is taken up by the support 14 so that the braking action of the ring 5 does not become effective against the sleeve 3 at this point. In order to adjust the distance of the support 14 correctly, a set screw 15 is employed, which engages the pin 14 from below, the said screw being secured in position by means of a lock-nut.

The invention is not restricted to the exact constructional form illustrated and described with reference to the drawing, but alterations may be made therein within the scope of the appended claims. For instance, the recesses 11, 12, 13 which serve to control the expanding shoe or ring 5 may be arranged differently upon the periphery of the sleeve 3 and a greater or less number of such recesses may be employed.

Having described our invention, we declare that what we claim and desire to secure by Letters Patent is:

1. A self-acting brake comprising a revolving member having at least one cam-shaped recess in its braking surface, an expanding member engaging said revolving member and a spreader member between said revolving member and said expanding member engaging in said braking surface recess to control the expansion of said expanding member.

2. A self-acting brake comprising a revolving member having at least one cam-shaped recess in its braking surface, an expanding member engaging said revolving member, said expanding member having at least one slot in its periphery, the sides of said slot being joined by a resilient connection and means cooperating with said braking surface recess for controlling the expansion of said expanding member in accordance with a predetermined cycle.

3. A self-acting brake comprising a revolving member having at least one cam-shaped recess therein, an expanding member engaging said revolving member, said expanding member having at least one slot in its periphery, the sides of said slot being joined by a resilient connection, a rotatable bearing member on each side of one of said slots and a rotatable spreader member located between said revolving member and said expanding member and adapted to engage with said cam-shaped recess and said rotatable bearing members carried by the slot.

4. A self-acting brake comprising a revolving member having at least one cam-shaped recess therein, an expanding member engaging said revolving member, said expanding member having at least one slot in its periphery, the sides of said slot being joined by means of a bolt passing through the same, said bolt having a nut at one end, a compression spring being disposed between said nut and one side of said slot, a rotatable bearing member on each side of at least one of said slots and a rotatable spreader member located between said revolving member and said expanding member and adapted to engage with said cam-shaped recess and said rotatable bearing members carried by the slot.

5. A self-acting brake comprising a revolving shaft, a sleeve surrounding said shaft and secured to revolve therewith and having at least one cam-shaped recess in its braking surface, an expanding member engaging said sleeve, a spreader member between said sleeve and said expanding member engaging in said braking surface recess to control the expansion of said expanding member.

6. A self-acting brake comprising a revolving shaft, a sleeve surrounding said shaft and secured to revolve therewith and having at least one cam-shaped recess therein, an expanding member engaging said sleeve having at least one slot therein having its sides joined by a resilient connection, a rotatable bearing member mounted on each side of said slot and a rotatable spreader member located between said first named bearing members and said sleeve.

7. A self-acting brake comprising a revolving member having at least one cam-shaped recess in its braking surface, an expanding member engaging said revolving member, a spreader member between said revolving member and said expanding member engaging in said braking surface recess to control the expansion of said expanding member and a stationary support for the expanding member located on the opposite side of the revolving member to said spreading member.

8. A self-acting brake comprising a revolving member having at least one cam-shaped recess therein, an expanding member engaging said revolving member, said expanding member having at least one slot in its periphery, the sides of said slot being joined by a resilient connection, a rotatable bearing member on each side of one of said slots, a rotatable spreading member located between said revolving member and said expanding member and adapted to engage with said cam-shaped recess and said rotatable bearing members carried by the slot and a stationary support for the expanding member located on the opposite side of the revolving member to said slot carrying said bearing members.

9. A self-acting brake according to claim 1 wherein the revolving member is a cam shaft having cams driven thereby, said cam-shaped recesses being so shaped and located as to prevent over-run of said cams.

10. A self-acting brake according to claim 1 having mechanism associated therewith wherein said cam-shaped recesses are so shaped and located as to eliminate play in said mechanism.

11. A self-acting brake comprising a revolving member, an expanding member completely encircling the revolving member, and a spreader member confined wholly between the lateral faces of said members and enclosed thereby to control the expansion of said expanding member.

12. A self-acting brake comprising a revolving member, an expanding member engaging therewith and means confined wholly between the lateral faces of said expanding member for controlling its expansion in accordance with a predetermined cycle.

HERMANN BRANDENBURG.
KARL BIENERT.